(12) United States Patent
Prokopenko et al.

(10) Patent No.: US 7,284,113 B2
(45) Date of Patent: Oct. 16, 2007

(54) SYNCHRONOUS PERIODICAL ORTHOGONAL DATA CONVERTER

(75) Inventors: Boris Prokopenko, Milpitas, CA (US); Timour Paltashev, Fremont, CA (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 318 days.

(21) Appl. No.: 10/666,083

(22) Filed: Sep. 19, 2003

(65) Prior Publication Data

US 2004/0172517 A1 Sep. 2, 2004

Related U.S. Application Data

(63) Continuation-in-part of application No. 10/354,795, filed on Jan. 29, 2003, now Pat. No. 7,146,486.

(51) Int. Cl.
G06F 15/76 (2006.01)
G09G 5/00 (2006.01)
(52) U.S. Cl. .......................... 712/7; 345/643
(58) Field of Classification Search ............... 712/7–9, 712/4; 345/643
See application file for complete search history.

(56) References Cited

U.S. PATENT DOCUMENTS 6,804,771 B1 * 10/2004 Jung et al. .................. 712/220
6,877,020 B1 * 4/2005 Bratt et al. .................. 708/400
2002/0032710 A1 * 3/2002 Saulsbury et al. .......... 708/400

OTHER PUBLICATIONS

"Linear-time Matrix Transpose Algorithms Using Vector Register File With Diagonal Registers"; Bedros Hanounik, Xiaobo (Sharon) Hu; 2001; IEEE.*

* cited by examiner

*Primary Examiner*—Alford Kindred
*Assistant Examiner*—Benjamin P. Geib
(74) *Attorney, Agent, or Firm*—Thomas, Kayden, Horstemeyer & Risley (57) ABSTRACT

An orthogonal data converter for converting the components of a sequential vector component flow to a parallel vector component flow. The data converter has an input rotator configured to rotate corresponding vector components of the sequential vector component flow by a prescribed amount, and a bank of register files configured to store the rotated vector components. The converter also has an output rotator configured to rotate the position of the vector components read from the bank of register files by a prescribed amount. A controller of the converter is operative to control the addressing of the bank of register files and the rotating of the vector components. In this regard, the controller is operative to write the vector components to the bank of register files in a prescribed order and read the vector components in a prescribed order to generate the parallel vector component flow.

16 Claims, 8 Drawing Sheets

| Cycle | AB0 | AB1 | AB2 | AB3 | Input vector components in order B0, B1, B2, B3 | Rotate Input | Output vector components in order B0, B1, B2, B3 | Rotate Output |
|---|---|---|---|---|---|---|---|---|
| 1 | 0 | 0 | 0 | 0 | X0 X1 X2 X3 | NO | INVALID | NO |
| 2 | 1 | 1 | 1 | 1 | Y3 Y0 Y1 Y2 | >>1 | INVALID | |
| 3 | 2 | 2 | 2 | 2 | Z2 Z3 Z0 Z1 | >>2 | INVALID | |
| 4 | 3 | 3 | 3 | 3 | W1 W2 W3 W0 | >>3 | INVALID | |
| | AB0 | AB0 | AB0 | AB0 | | | | |
| 5 | 0 | 1 | 2 | 3 | X4 X5 X6 X7 | NO | X0 Y0 Z0 W0 | NO |
| 6 | 3 | 0 | 1 | 2 | Y7 Y4 Y5 Y6 | >>1 | W1 X1 Y1 Z1 | <<1 |
| 7 | 2 | 3 | 0 | 1 | Z6 Z7 Z4 Z5 | >>2 | Z2 W2 X2 Y2 | <<2 |
| 8 | 1 | 2 | 3 | 0 | W5 W6 W7 W4 | >>3 | Y3 Z3 W3 X3 | <<3 |
| | AB0 | AB0+1 | AB0+2 | AB0+3 | | | | |
| 9 | 0 | 0 | 0 | 0 | X8 X9 X10 X11 | NO | X4 Y4 Z4 W4 | NO |
| 10 | 1 | 1 | 1 | 1 | Y11 Y8 Y9 Y10 | >>1 | W5 X5 Y5 Z5 | <<1 |
| 11 | 2 | 2 | 2 | 2 | Z10 Z11 Z8 Z9 | >>2 | Z6 W6 X6 Y6 | <<2 |
| 12 | 3 | 3 | 3 | 3 | W9 W10 W11 W8 | >>3 | Y7 Z7 W7 X7 | <<3 |
| | AB0 | AB0 | AB0 | AB0 | | | | |

FIG. 8

SYNCHRONOUS PERIODICAL ORTHOGONAL DATA CONVERTER

CROSS REFERENCE TO RELATED APPLICATIONS

This application is a continuation-in-part application of U.S. Application entitled "SIMD PROCESSOR WITH SCALAR ALUS CAPABLE OF PROCESSING GRAPHICS VECTOR", filed Jan. 29, 2003, now U.S. Pat. No. 7,146,486 Ser. No. 10/354,795, which application is hereby incorporated by reference into the instant application.

BACKGROUND OF THE INVENTION

1. Field of the Invention

The present invention generally relates to data format conversion and more particularly to a system and method for data reordering in vector processing in order to support the conversion of sequential (vertical) vector component flow into parallel (full vector or horizontal) vector component flow.

2. Description of the Related Art

Figure 1:
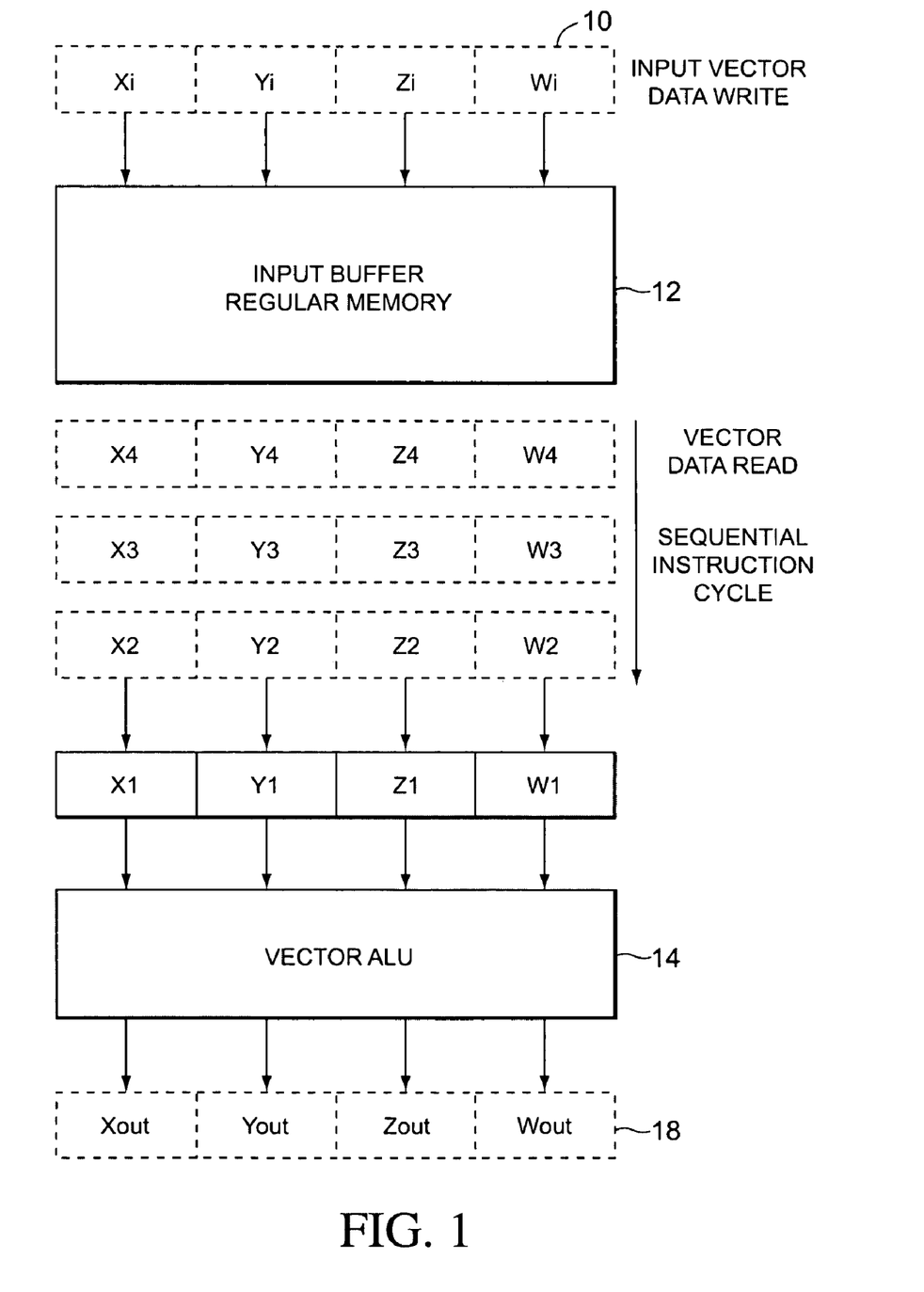
FIG. 1 illustrates the general structure of a vector processing unit having a vector ALU processing unit.

Graphics data can be represented in vector format with components of geometry information (i.e., X, Y, Z, and W) or pixel value information (i.e., R, G, B, A). A geometry engine processes the components of the vector. FIG. 1 illustrates how a typical graphics engine processes graphics vectors. A graphics vector 10 is inputted into an input buffer 12 which stores the graphics vectors in regular memory. The graphics vector has components Xi, Yi, Zi, and Wi. The input buffer 12 outputs the graphics vector to a vector arithmetic logic unit (ALU) 14 which performs functions on the graphics vector 10. The vector ALU 14 outputs a processed graphics vector 18, which is in the same format as the input graphics vector 10. Specifically, the processed graphics vector 18 contains the Xout, Yout, Zout, and Wout components. In this regard, the vector ALU 14 processes the vector components in time parallel (full vector or horizontal) vector component flow. Each of the components X, Y, Z, and W is processed at the same time by the vector ALU 14 such that the output contains each component Xout, Yout, Zout and Wout in a common format.

Figure 2:
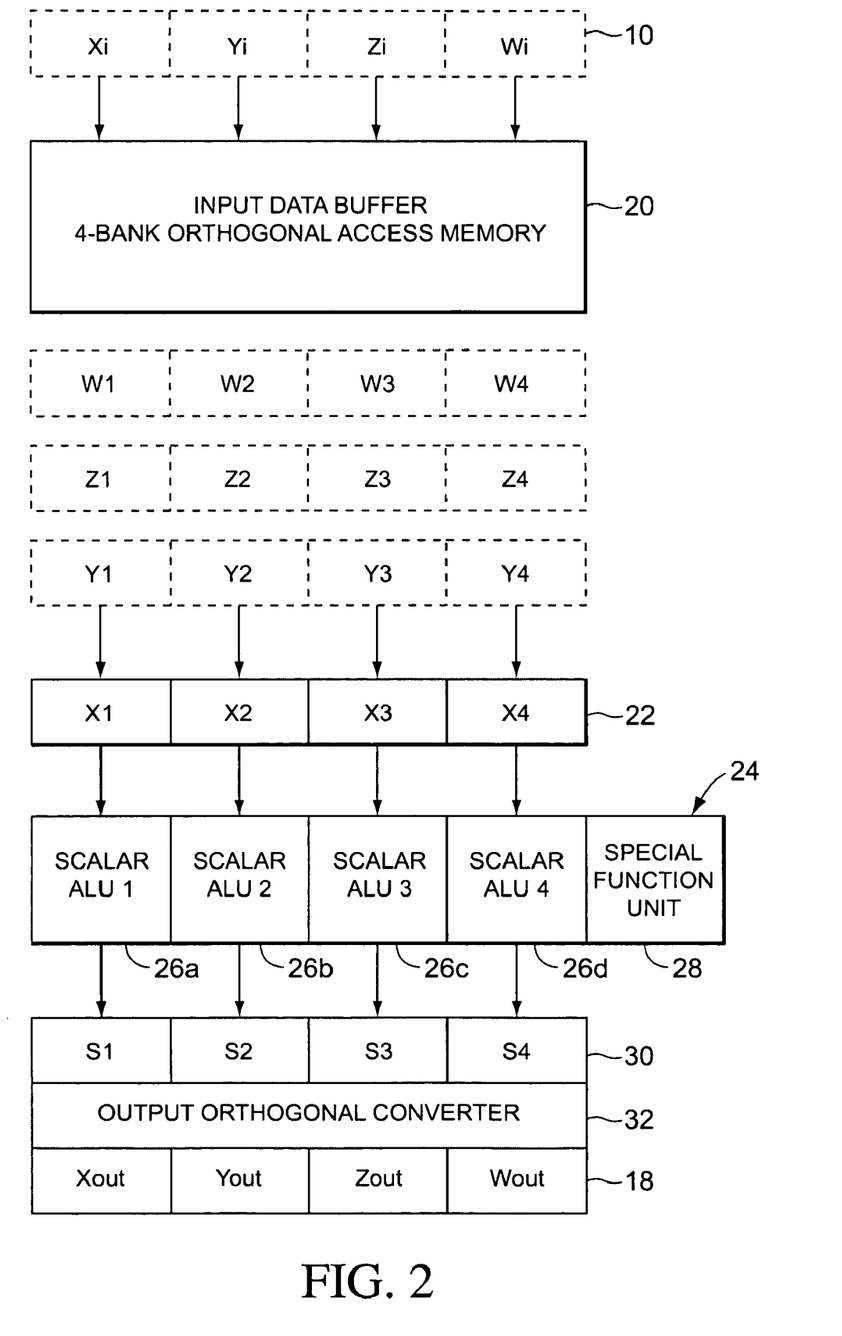
FIG. 2 illustrates the general structure of a vector processing unit with a scalar processing unit.

Recently, scalar graphics processors have been developed which process the graphics vector in a vertical vector component flow. FIG. 2 shows a SIMD (Single Instruction, Multiple Data) processing unit using scalar ALU's for processing graphics vectors. The graphics vector 10 is inputted into a input buffer 20 which is a 4-bank orthogonal access memory, as is commonly known in the art. The input buffer 20 is operable to rearrange each of the graphics vectors 10 into common components. Specifically, the output of the input buffer 20 will be a vector containing the values of common components in a vertical vector format. Referring to FIG. 2, the input data buffer 20 outputs a component vector 22 which contains common or like components. For instance, the component vector 22 may contain the values of only the X component or only the Y component.

The input data buffer 20 outputs the component vector 22 in a time-sequential (vertical) vector component flow to a scalar processor 24 which operates on each of the components of the component vector 22 individually. The scalar processor 24 contains four scalar ALU's 26a-26d and is described in greater detail in applicant's co-pending U.S. Patent Application "SIMD PROCESSOR WITH SCALAR ALUS CAPABLE OF PROCESSING GRAPHICS VEC-TOR DATA", Ser. No. 10/354,795, filed Jan. 29, 2003, the contents of which are incorporated by reference herein.

The scalar processor 24 outputs a scalar results vector 30 that contains the results of the computed vector components. However, the scalar results vector 30 is not in the same format as graphics vector 10. Specifically, the scalar results vector 30 is in a vertical (time-serial) format because the scalar processor 24 operates in a sequential (vertical) vector component flow. Therefore, the scalar results vector 30 needs to be converted into a time-parallel (full vector or horizontal) format.

BRIEF SUMMARY OF THE INVENTION

An output orthogonal converter 32 constructed in accordance with the present invention is operable to rearrange the components from the scalar processor 24 into the proper format. As will be further explained below, the output orthogonal converter 32 converts the scalar results vectors into the processed vector 18 that are outputted in parallel vector component flow.

The present invention is an output orthogonal converter 32 which is operable to rearrange vector components into a parallel vector component flow after processing by the scalar processor 24. The present invention provides synchronous conversion of a vertical vector component stream to a parallel vector representation.

In accordance with the present invention there is provided an orthogonal data converter for converting the components of a sequential vector component flow into a parallel vector component flow. The data converter has an input rotator configured to rotate (in a clockwise direction) the position of the vector components in the sequential vector component flow a prescribed amount. The converter also has a bank of register files configured to store the rotated vector component flow from the input rotator. The converter also has an output rotator configured to rotate (in a counter-clockwise direction) the position of the vector components read from the bank of register files a prescribed amount. A controller of the converter is operative to control the addressing of the bank of register files and the rotating of the vector components. In this regard, the controller is operative to write the vector components to the bank of register files in a prescribed order and simultaneously read the vector components in a prescribed order to generate the parallel vector component flow.

In the preferred embodiment of the present invention, the bank of register files has a plurality of component registers for storing the vector components. In this respect, each vector has x components and the bank of register files has x columns of component registers. Typically, each of the columns will have x component registers. The bank of register files is configured to write and read at the same cycle. The controller can alternate between horizontal write/read operations and vertical write/read operations to the bank of register files. In this respect, the controller alternates every x cycles between horizontal and vertical read/write operations. The output rotator is configured to rotate the vector components to a position that is equal and opposite to the rotation of the input rotator.

In accordance with the present invention, there is provided a method for converting a group of vectors from a time serial to a time parallel format, where in the time serial format, sets of corresponding components of the vectors each have a time slot, and in time parallel format, each vector has a time slot. For each set of corresponding components, the corresponding components are rotated an amount that depends on the time slot of the corresponding component and each set of rotated corresponding components is written in a separate set of registers in a bank of register files. For each vector in the group, selected registers in the bank are read to collect the components of the vector and the collected components of the vector are rotated an amount that depends on the time slot of the vector. Reading and writing to the bank of register files can occur at the same time. In one embodiment the register bank is written and read horizontally for n cycles and then written and read vertically for n cycles, thus alternating between horizontal and vertical operations every n cycles.

BRIEF DESCRIPTION OF THE DRAWINGS

These as well as other features of the present invention will become more apparent upon reference to the drawings wherein.

DETAILED DESCRIPTION OF THE INVENTION

Figure 3:
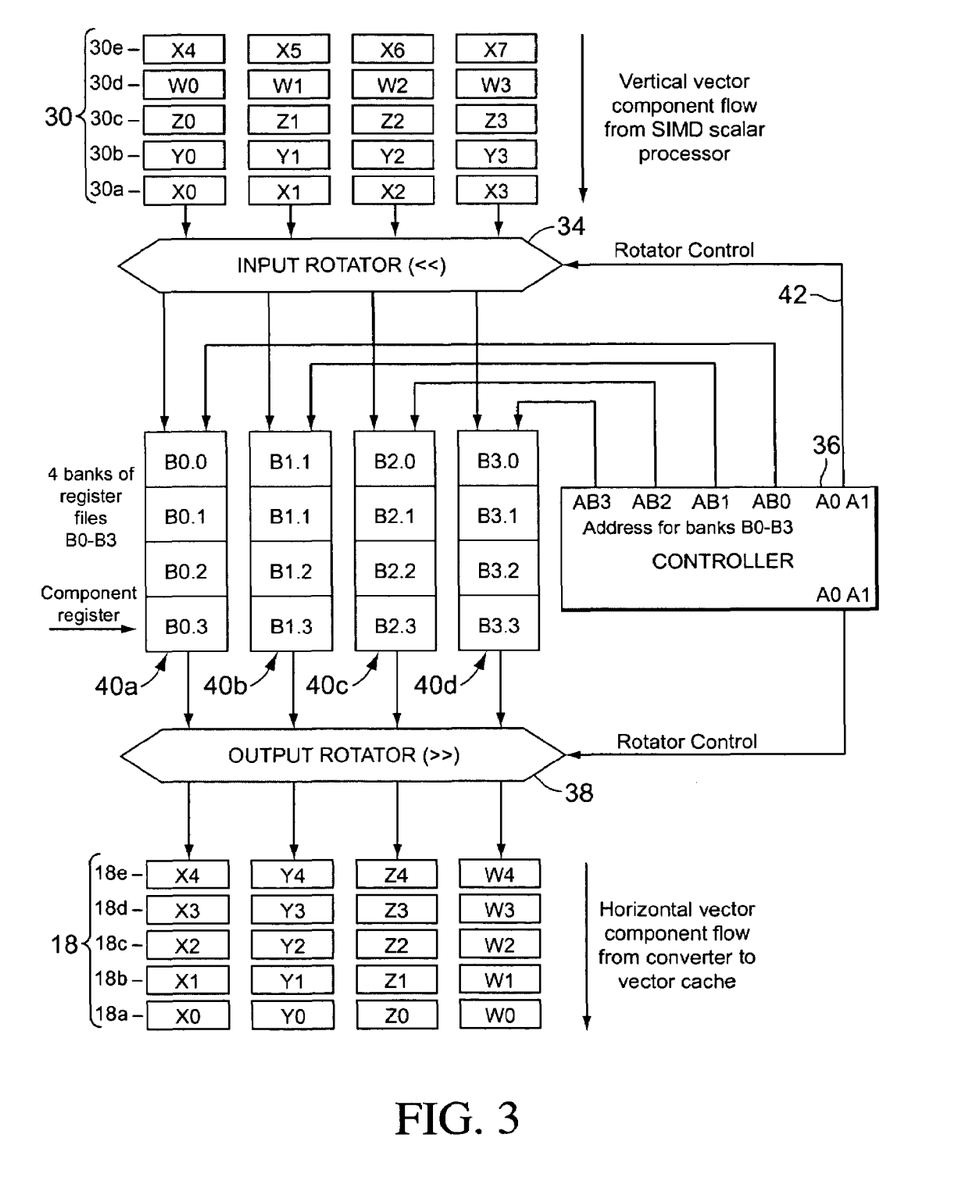
FIG. 3 illustrates the general structure of a four component orthogonal data converter for use with the scalar processing unit shown in FIG. 2.

Referring to the drawings wherein the showings are for purposes of illustrating a preferred embodiment of the present invention only, and not for purposes of limiting the same, FIG. 3 shows the general structure for an orthogonal converter 32 constructed in accordance with the present invention. Scalar result vectors 30 from scalar processor 24 are fed into an input rotator 34. As previously discussed, the scalar result vectors 30 are in time-sequential vector component flow whereby corresponding components are represented in the same time slot. For example, scalar result vector 30a contains X components X0-X3. Similarly, scalar result vector 30b contains the Y components Y0-Y3. It will be recognized by those of ordinary skill in the art, that even though the graphics vector 30 is shown with four components (i.e., X, Y, Z, and W), that the present invention can be implemented with any graphics vector having more or less components.

The input rotator 34 is operative to rotate the components of the scalar result vectors 30 a desired number of positions. The number of positions is determined by a controller 36 which sends an input rotator control signal to the input rotator 34. After being rotated, the scalar result vectors 30 are then written into component registers of a bank of register files B0-B3. The bank of register files B0-B3 has one register file Bx.0 to Bx.3, for storing the components of the scalar result vectors 30. The controller 36 is operable to send address signals AB0-AB3 to the bank of register files B0-B3 in order to read or write the vector component to the desired component register B0.0-B3.3. As will be further explained below, the controller 36 through address lines AB0-AB3 controls the writing and reading of the vector components to and from the bank of register files B0-B3. The component registers B0.0-B3.3 can be read and written to in the same clock cycle.

The vector components from the component registers B0.0-B3.3 are received by an output rotator 38 which rotates the vector components a desired number of positions. Specifically, as will be further explained below, the bank of register files B0-B3 can be read in a manner that outputs the components in the full vector format. The processed vector 18 that is outputted by the output rotator 28 contains the components of a vector in time-parallel format. For example, the output rotator 38 outputs a first processed vector 18a having components X0, Y0, Z0 and W0 in that order. The next processed vector 18b will have components X1, Y1, Z1, and W1. In this regard, the output of the output rotator 38 are processed vectors 18 which are in time-parallel vector component flow.

Figure 4:
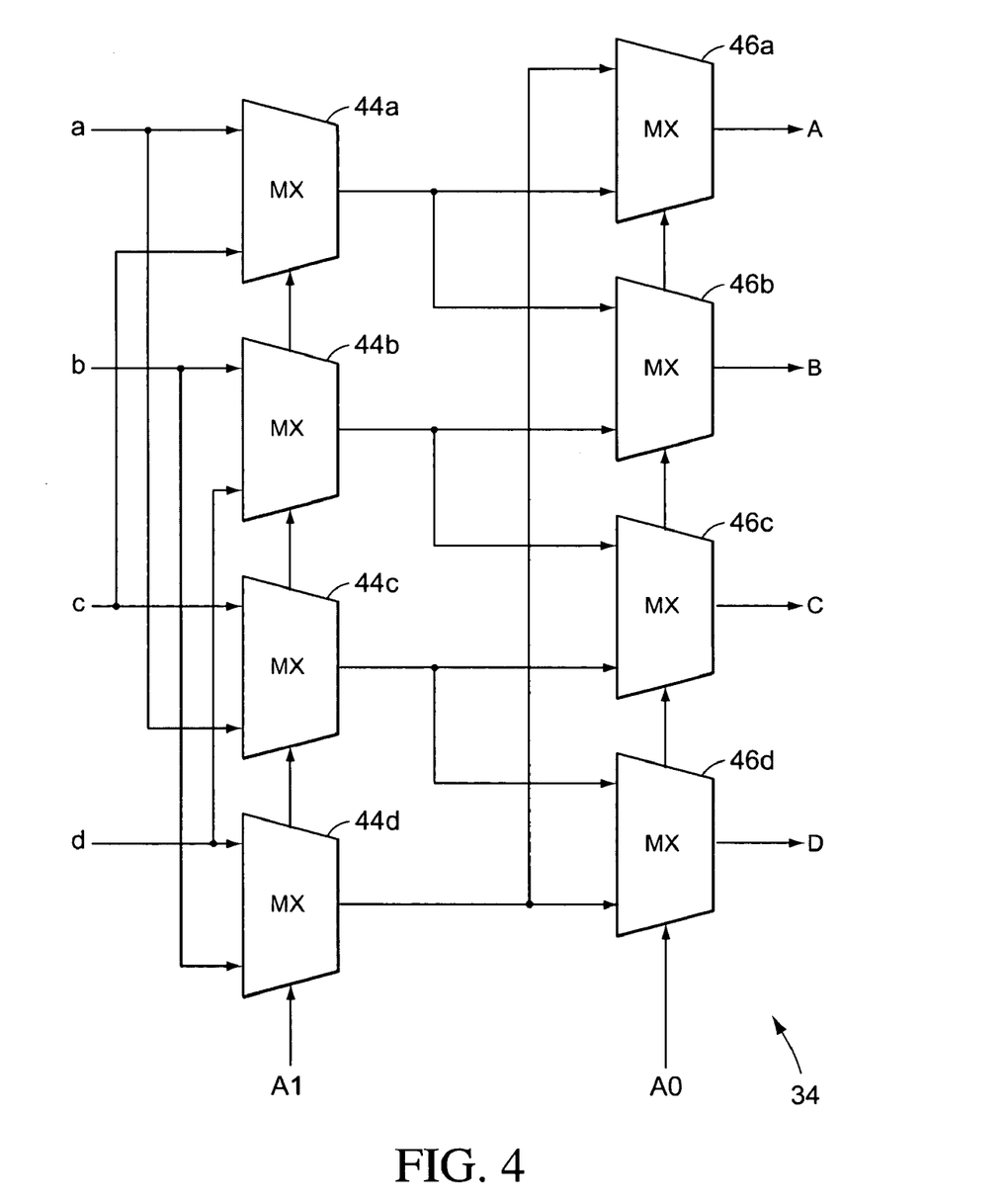
FIG. 4 illustrates the general structure of an input rotator for the vector converter shown in FIG. 3.

Referring to FIG. 4, the input rotator 34 is illustrated having a bank of first stage multiplexers 44a-44d connected to a bank of second stage multiplexers 46a-46d. The input to the first stage of multiplexers 44a-44d are the components from scalar results vector 30. Accordingly, the inputs a b c d to the first stage of multiplexers 44a-44d are X0, X1, X2, X3; Y0, Y1, Y2, Y3; Z0, Z1, Z2, Z3, etc . . . The second stage of multiplexers 46a-46d outputs the components in rotated format to the component registers B0.0-B3.3. Specifically, the multiplexer output A of multiplexer 46a is connected to the B0 bank of registers. The output B of multiplexer 46b is connected to the B1 bank of registers, while the output C of multiplexer 46c is connected to the B2 bank of registers. Finally, the output D of multiplexer 46d is connected to the B3 bank of registers. The address lines AB0-AB3 from the controller 36 identify the proper component register B0.0-B3.3 of each respective register bank B0-B3 into which the vector component will be written. Input and output rotator control bits A0 and A1 control the operation of the multiplexers 44a-44d and 46a-46d such that the components can be outputted in a desired order (i.e., properly rotated). Specifically, the first stage of multiplexers 44a-44d is controlled by rotator control bit A1, while the second stage of multiplexers 46a-46d are controlled by rotator control bit A0. In this regard, it is possible to provide any component at the output of each of the second stage multiplexers 46a-46d.

Figure 5:
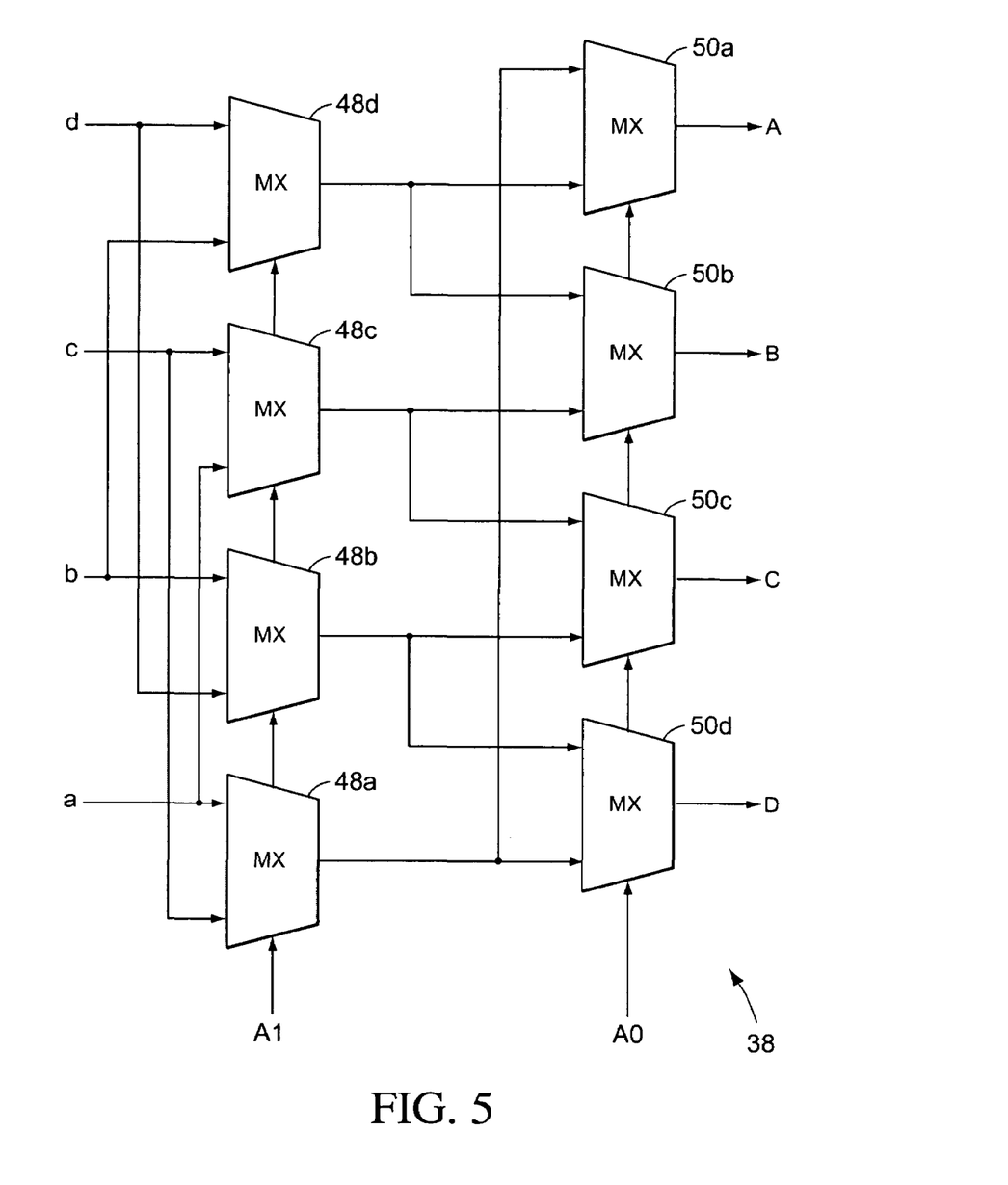
FIG. 5 illustrates the general structure of an output rotator for the vector converter shown in FIG. 3.

The output rotator 38 is shown in FIG. 5. The output rotator 38 is similar to the input rotator 36 and uses the same input and output rotator control bits A0 and A1 to control the rotation of the vector components. Specifically, the output rotator 38 has a bank of first stage multiplexers 48a-48d connected to the bank of register files B0-B3. In this regard, the input a is connected to bank B0, the input b is connected to bank B1, the input c is connected to bank B2 and input d is connected to bank B3. The address lines AB0-AB3 from the controller 36 identify the proper component register B0.0-B3.3 of each respective register bank B0-B3 from which the component will be read. Rotator control bit A1 is used to select which input of each of the first stage multiplexers 48a-48d is chosen as the output. Each of the respective outputs from the first stage multiplexers 48a-48d is the input to one of the second stage multiplexers 50a-50d. The rotator control bit A0 is used to select which input is chosen as the output of the second stage multiplexers 50a-50d. Accordingly, by choosing the proper combination of rotator control bits A0, A1 it is possible to rotate the register components with the first stage multiplexers 48a-48d and second stage multiplexers 50a-50d. Therefore, the second stage multiplexers 50a-50d can generate parallel (full vector or horizontal) vector component flow.

Figure 6:
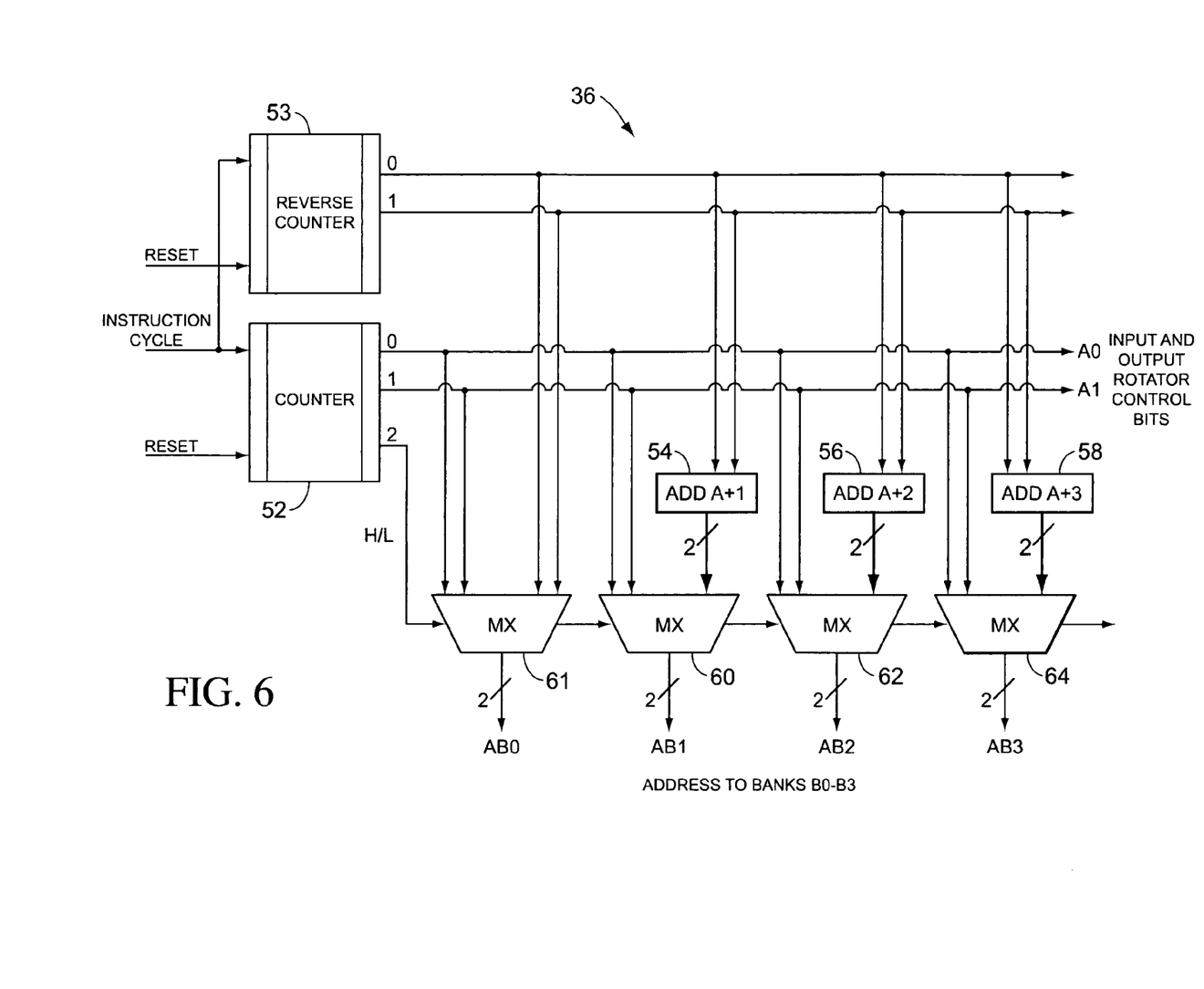
FIG. 6 illustrates the general structure of a controller for the vector converter shown in FIG. 3.

Referring to FIG. 6, the structure of the controller 36 which generates rotator control bits A1, A2, and address bits AB0-AB3 is shown. The controller 36 has an up counter 52 which is incremented by the instruction cycle of the operation and a down counter 53 that is decremented by the instruction cycle. The up counter 52 has three outputs 0, 1, and 2. Outputs 0 and 1 are input and output rotator control bits A0 and A1. Output 2 of the up counter provides a selection signal H/L to the four multiplexers 61, 60, 62, and 64. The down counter 53 has two outputs 0 and 1, which are inputs to adders 54, 56, 58, and multiplexer 61. The adders 54, 56, and 58, add a constant, 1 or 2 or 3, respectively, to the count produced by the down counter and provide the sums to the inputs of multiplexers 60, 62, and 64, respectively. The outputs of the multiplexers provide the addressing to the banks B0-B3. During instruction cycles 1-4, the H/L signal selects the up counter inputs of the multiplexers 61, 60, 62, 64 to provide the addresses shown in FIG. 8 for those cycles. During instruction cycles 5-8, the H/L signal selects the down counter address for multiplexer 61 and the adder outputs for multiplexers 60, 62, 64 to provide the addresses shown in FIG. 8 for those cycles. For cycles 9-12, the H/L signal again selects the up counter outputs for the AB0-3 bank addresses.

The controller 36 thus generates the input and output rotator control bits A0 and A1, as well as the address lines AB0-AB3 in a periodic fashion in order to write and read components to and from the component registers in the proper order. In order to properly rearrange the component data into the proper format, components are first "horizontally" written into the component registers B0.0-B3.3 and then "vertically" read therefrom as new components are written thereto at the same time. Next the components are "horizontally" read from the registers B0.0-B3.3 while new data is written thereto simultaneously. This process is continuously repeated in order to convert the components.

Figure 8:
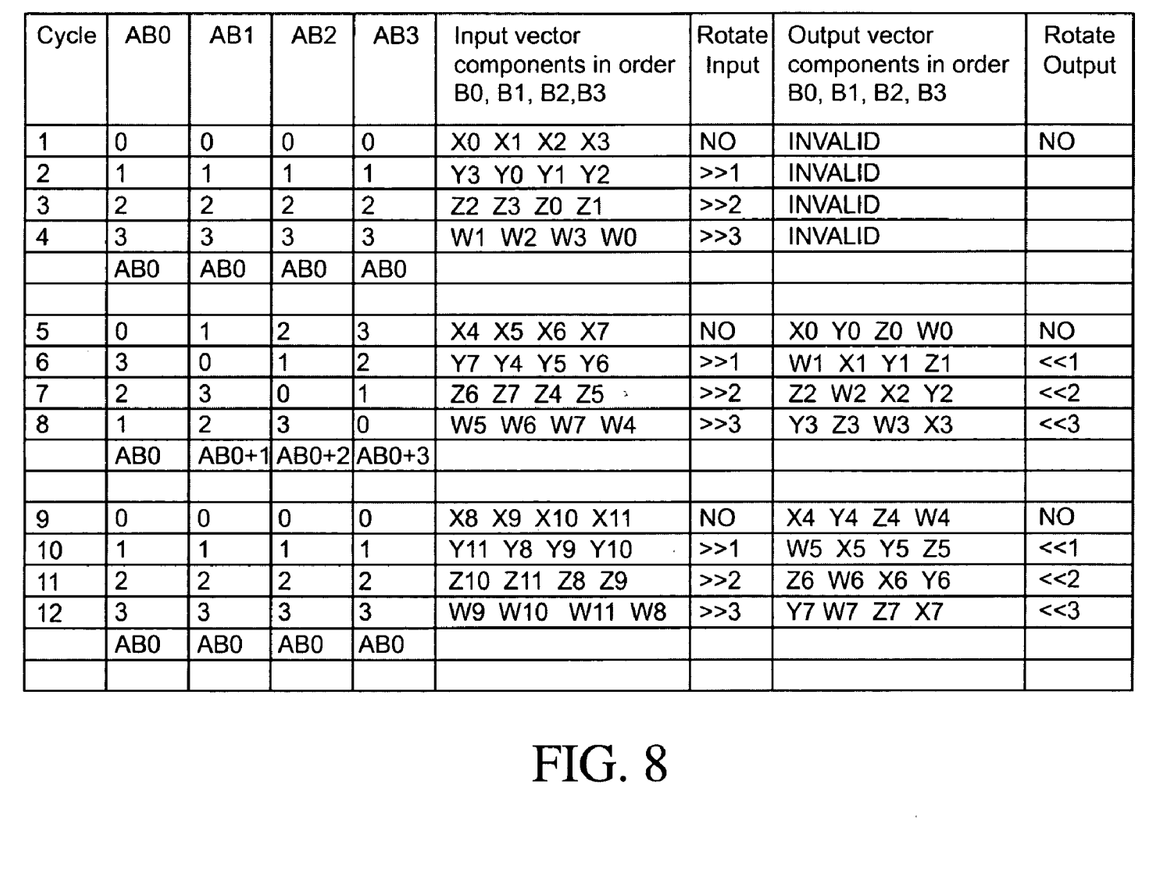
FIG. 8 is a timing diagram for a four component orthogonal conversion.

Referring to FIG. 8, a timing diagram for a four component orthogonal conversion using the orthogonal converter 32 is shown. The timing diagram shows which component register B0.0-B3.3 is being addressed by address lines AB0-AB3. Furthermore, the timing diagram shows the input vector components in order of register files B0-B3, as well as the output vector components in order of register files B0-B3. The amount of rotation for the input and output vectors is also shown in FIG. 8.

During the first four cycles (i.e., cycles 1-4), the vector components are written "horizontally" into the component registers B0.0-B3.3. Specifically, during the first (1) instruction cycle, the corresponding components in the first time slot, X0, X1, X2, and X3, are written into respective component registers B0.0, B1.0, B2.0, and B3.0. In the second (2) instruction cycle, the corresponding components in the second time slot, Y0, Y1, Y2, and Y3, are rotated clockwise one position (Y3, Y0, Y1, Y2) by the input rotator 34 and then written respectively into component registers B0.1, B1.1, B2.1, and B3.1. Similarly, in the third (3) instruction cycle, the corresponding components in the third time slot, Z0, Z1, Z2, and Z3, are rotated clockwise two positions (Z2, Z3, Z0, Z1) by the input rotator 34 and written respectively into component registers B0.2, B1.2, B2.2, and B3.2. In the fourth (4) instruction cycle, the corresponding components in the fourth time slot, W0, W1, W2, and W3, are rotated clockwise three positions (W1, W2, W3, W0) by the input rotator and written respectively into component registers B0.3, B1.3, B2.3 and B3.3. During the first four instruction cycles, the vector components are only being written into the component registers B0.0-B3.3 and not being read therefrom. The controller 36 generates the input and output rotator control bits A0, A1 as well as the address lines AB0-AB3 in order to write the vector components in the appropriate sequence.

From the fifth (5) to eighth (8) instruction cycles, the vector components are both read from and written to the component registers B0.0-B3.3. Specifically, referring to FIG. 8, during the fifth (5) instruction cycle, the address lines AB0-AB3 address the proper component register according to the table shown in FIG. 8. Once a component register is addressed, the component written to that component register during the previous addressing cycle is read. Once the vector component has been read, a new vector component is written to that component register. Accordingly, during the fifth (5) instruction cycle, vector components X0, Y0, Z0, and W0 are read from registers B0.0, B1.1, B2.2 and B3.3 respectively, and vector components X4, X5, X6, and X7 are written into B0.0, B1.1, B2.2 and B3.3 respectively. As noted in FIG. 8, it is not necessary to rotate the input and output vectors during the fifth (5) instruction cycle. Furthermore, there has been a "45 degree counter clockwise rotation" in the registers, such that the diagonal registers B0.0, B1.1, B2.2 and B3.3 just read become the "new" first horizontal set of registers for writing. In cycle 6, registers B1.0, B2.1, B3.2 and B0.3 become the new second horizontal set of registers for writing, because these were the registers read in cycle 6. In cycle 7, registers B2.0, B3.1, B0.2 and B1.3, become the new third horizontal set of registers for writing, because these were the registers read in cycle 7. Finally, in cycle 8, registers B3.0, B0.1, B1.2, and B2.3 become the new fourth set of register for writing because these were the registers read in cycle 8. The component registers are said to be "vertically" read and written according to the addressing shown in FIG. 8 for the fifth (5) through eighth (8) instruction cycles.

During the ninth (9) instruction cycle, the component registers B0.0-B3.3 are "horizontally" read and written with vector components. The manner of addressing the component registers B0.0-B3.3 and the manner of rotating the input and output vectors during the ninth (9) to twelfth (12) instruction cycles is identical to the first to fifth (1-4) instruction cycles. Therefore, during the ninth (9) instruction cycle, the output vector is X4, Y4, Z4, W4 which components were written during the fifth to eighth (5-8) instruction cycles. Furthermore, during the ninth (9) instruction cycle, the X components X8, X9, X10, and X11 are written to the respective component registers being read. In this regard, during the ninth (9) to twelfth (12) instruction cycles, the vector components are "horizontally" written and read.

In order to continue converting the vector components to the parallel vector component flow, the process alternates between "vertically" writing and reading vector components and "horizontally" writing and reading vector components. In this regard, after the twelfth (12) instruction cycle, the addressing and rotation would begin again as shown in the fifth (5) instruction cycle and continue. In this regard, the addressing and rotation pattern shown for the fifth (5) through eighth (8) instruction cycles is repeated for "vertical" writing and reading, and then the ninth (9) through twelfth (12) instruction cycles are repeated for "horizontal" writing and reading of vector components. This process continues until all of the vector components have been converted.

Figure 7:
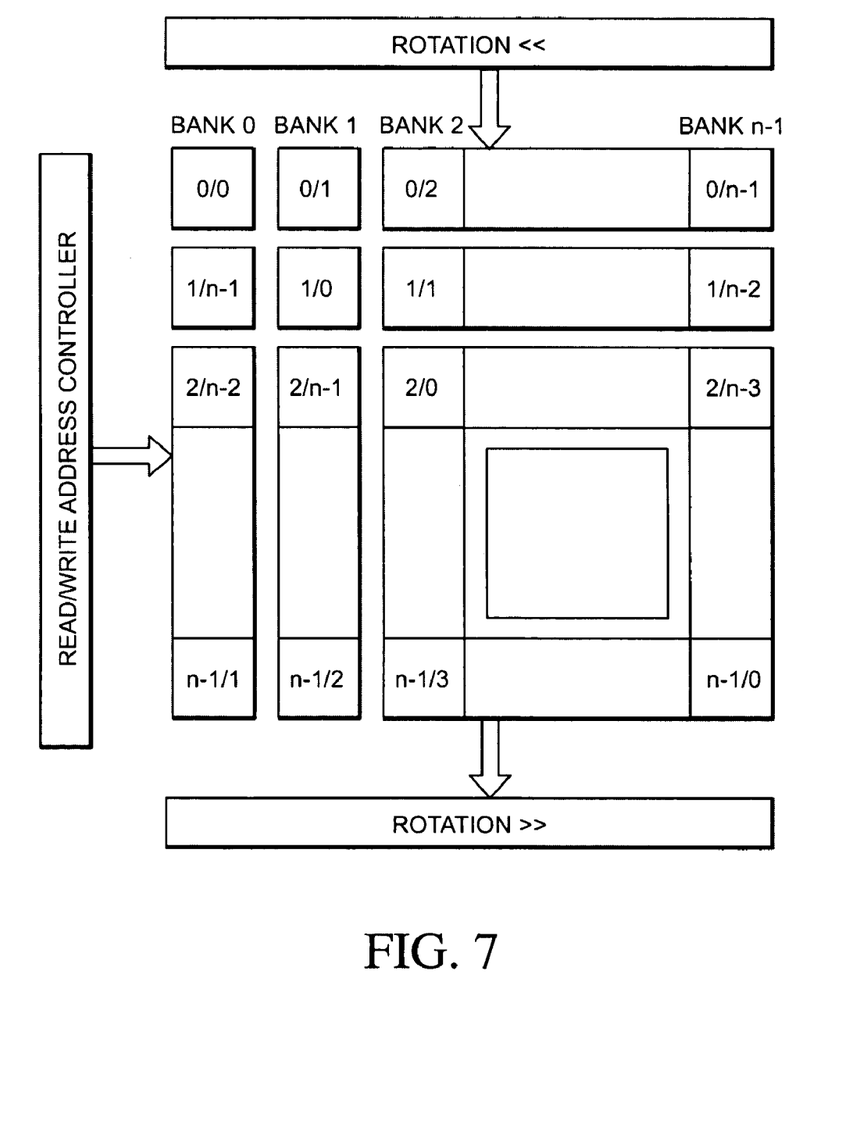
FIG. 7 illustrates the general data layout scheme for a multi-component vector data converter.

The description above has been directed toward a four component vector. However, it will be recognized that the method of the present invention can be adapted to vectors having any number of components as shown in FIG. 7. For example a data stream can be represented as:

$$X_i = \{X_{i0}, X_{i1}, \ldots, X_{in-1}\} \quad (1)$$

where n is the width of a separate token in the stream and i is the number of the token of the stream.

Then starting at some token i, it is desired to generate the output $Y_{i+j}$:

$$Y_{i+j} = \{Y_{i+j0}, Y_{i+j1}, \ldots, Y_{i+jn-1}\} = \{X_{ij}, X_{i+1j}, \ldots, X_{i+n-1j}\} \quad (2)$$

where j<n.

In order to realize this output, an n-bank orthogonal memory structure with a height n is needed as shown in FIG. 7. The input data are X indexed by the components, and the output data are Y indexed by the components. The memory input data are I indexed by the banks, and the memory output data are O indexed by the banks. Furthermore, the read address and write address are R and W indexed by the banks also.

At the first stage, the memory is written into at each clock j into each bank i such that:

$$W_{ij} = j \quad (3)$$

$$I_{ij} = X_{((i+j) \bmod n)j} \quad (4),$$

where the "mod" function takes the remainder after division by the divisor and where the function ((i+j)mod n) performs a clockwise rotation for each value of j>0, the amount of rotation depending on the value of i. If i=0 no rotation is performed. If i=1, a one step clockwise rotation occurs. A two step clockwise rotation occurs when a i=2 and a three step clockwise rotation occurs when i=3.

At the same time, the previously written data can be read from the same locations such that:

$$R_{ij} = j \quad (5)$$

$$Y_{ij} = O_{((i-j) \bmod n)j} \quad (6),$$

where ((i−j)mod n) performs a counter-clockwise rotation for each value of j>0, the amount of rotation depending on the value of i.

This is the "horizontal" read-write stage. After n clocks, all the previous contents have been read, and the new data written. As such, the process switches from the "horizontal" read-write stage to the "vertical" read-write stage such that the data that had been written "horizontally" can be read "vertically".

The data is read in n clocks at each clock j from each bank i such that:

$$R_{ij} = (i+j) \bmod n \quad (7)$$

$$Y_{ij} = O_{((i+j) \bmod n)j} \quad (8)$$

At the same time, new data can be written "vertically" so that at the next stage, the data can be read horizontally such that:

$$W_{ij} = (i+j) \bmod n \quad (9)$$

$$I_{ij} = X_{((i+j) \bmod n)j} \quad (10)$$

The process continues switching between "horizontal" and "vertical" each n clocks. The output stream has the same number of idle cycles as the input stream thereby leading to a total latency of n.

Referring to FIG. 7, it can be seen that if the data is arranged in banks according to the method of the present invention, then if it is desired to read/write elements j/*, then banks with the same address are accessed. However, if it is desired to read/write elements */i, then the data is read "diagonally" whereby the address for each bank is incremented or decremented accordingly. Furthermore, FIG. 7 illustrates that the data must be rotated according to the access position when writing and then rotated back when reading.

Additional modifications and improvements of the present invention may also be apparent to those of ordinary skill in the art. Thus, the particular combination of parts described and illustrated herein is intended to represent only a certain embodiment of the present invention, and is not intended to serve as a limitation of alternative devices within the spirit and scope of the invention.

What is claimed is:

1. A data converter for converting a group of vectors from a time serial to a time parallel format, wherein in the time serial format, sets of corresponding components of the vectors each have a time slot, and in time parallel format, each vector has a time slot, the converter comprising:

an input rotator configured to rotate each set of corresponding components of all time serial vectors by an amount that depends on the time slot of the set of corresponding components, wherein the input rotator is comprised of a plurality of multiplexer stages for rotating each set of corresponding components;

a bank of register files coupled to the input rotator to receive a rotated set of corresponding components, and having a register file in the bank configured to store each rotated set of corresponding components;

an output rotator coupled to the bank of registers files, for receiving and rotating the components of a vector by an amount that depends on the time slot of the vector in time parallel format to generate the vector in time parallel format, wherein the output rotator is comprised of a plurality of multiplexer stages for rotating the components of each vector; and a controller configured to control addressing of the bank of register files when the corresponding components of each vector are stored in a register of the bank in horizontal and vertical write operations, and to control addressing of the bank to collect the components of each vector for subsequent output rotation in horizontal and vertical read operations, said controller further configured to control alternating horizontal reading and writing and vertical reading and writing operations upon the bank of register files, wherein the controller is comprised of:

address lines configured to identify a proper component register of each respective register bank, wherein the address lines are provided by outputs of multiplexers configured to receive inputs from an up counter and a down counter located within the controller; and control bits configured to control operation of the multiplexer stages within the input rotator and the output rotator, wherein the control bits are provided by outputs from the up counter.

2. The data converter of claim 1, wherein each vector has n components indexed from 0 to n−1 such that there are 0 to n−1 sets of corresponding components; and wherein the amount of rotation by the input rotator is zero for the $0^{th}$ set of corresponding components, and n−1 steps clockwise for the (n−1)th set, any intervening sets of corresponding components being rotated by an amount equal to the ordinal number of the set.

3. The data converter of claim 1,
wherein there are n vectors indexed from 0 to n−1; and
wherein the amount of rotation by the output rotator is zero for the $0^{th}$ vector and n−1 steps counter-clockwise for the (n−1)th vector, any intervening vectors being rotated by an amount equal to the ordinal number of the vector.

4. The data converter of claim 1, wherein each register file in the bank includes a register for storing vector components.

5. The data converter of claim 4, wherein each vector has n components and each register file in the bank has n component registers.

6. The data converter of claim 5, wherein there are n register files in the bank.

7. The data converter of claim 1, wherein the bank of register files is configured to write and read vector components at the same clock cycle.

8. The data converter of claim 1, wherein each vector has n components and the controller horizontally writes n sets of corresponding components and horizontally reads n vectors.

9. The data converter of claim 8, wherein, after the controller horizontally writes n sets of corresponding components and horizontally reads n vectors, the controller vertically writes n sets of corresponding components and vertically reads n vectors.

10. The data converter of claim 1, wherein the output rotator rotates each vector component a position equal and opposite to the input rotator.

11. A data converter for converting a group of vectors from a time serial to a time parallel format, wherein in the time serial format, sets of corresponding components of the vectors each have a time slot, and in time parallel format, each vector has a time slot, the converter comprising:
  input rotation means for rotating each set of corresponding components of all vectors by a first prescribed amount depending on the particular set, wherein the input rotation means is comprised of a plurality of multiplexing means for rotating each set of corresponding components;
  storage means coupled to the input rotation means, for storing each rotated set of corresponding components; and
  output rotation means coupled to the storage means, for receiving components of a vector from the storage means and rotating the components of the vector by a second prescribed amount depending on the particular vector to generate a vector in time parallel format, wherein the output rotation means is comprised of a plurality of multiplexing means for rotating the components of each vector; and
  controller means, communicably coupled to the input rotation means, the storage means and the output rotation means, for controlling writing and reading of vector components to the storage means and the rotation of vector components by the output rotation means and the input rotation means, and for controlling said reading and writing operations horizontally and vertically, said horizontal operations alternating with said vertical operations, wherein the input rotation means and the output rotation means are communicably coupled to the controller means through control signals, wherein the control signals between the controller means and input rotation means are the same control signals as the control signals between the controller means and the output rotation means, and wherein the controller means is comprised of:
    address lines configured to identify a proper component register of each respective register bank, wherein the address lines are provided by outputs of multiplexers configured to receive inputs from an up counter and a down counter located within the controller; and
    control bits configured to control operation of the multiplexer stages within the input rotation and the output rotator, wherein the control bits are provided by outputs from the up counter.

12. The data converter of claim 11 wherein:
  the input rotation means is an input rotator configured to rotate each set of corresponding components of all vectors by an amount that depends on the time slot of the set of corresponding components;
  the storage means is a bank of register files with a register file in the bank configured to store each rotated set of corresponding components; and
  the output rotation means is an output rotator configured to receive and rotate the components of a vector by an amount that depends on the time slot of the vector.

13. The data converter of claim 12 wherein the storage means is configured to write and read vector components in the same clock cycle.

14. The data converter of claim 13 wherein the storage means is configured to write corresponding components horizontally and then read vectors horizontally over a prescribed number of clock cycles.

15. The data converter of claim 14, wherein, during another prescribed number of clock cycles, the storage means is configured to write corresponding components vertically and then read vectors vertically.

16. The data converter of claim 11 wherein the output rotation means rotates time parallel vector components in a direction opposite to the direction that the input rotation means rotates a set of corresponding vector components.

* * * * *